Jan. 20, 1970     W. NILL     3,490,760
HOLDING DEVICE FOR THE BUILDING-IN OF UPRIGHTS
Filed Sept. 7, 1966
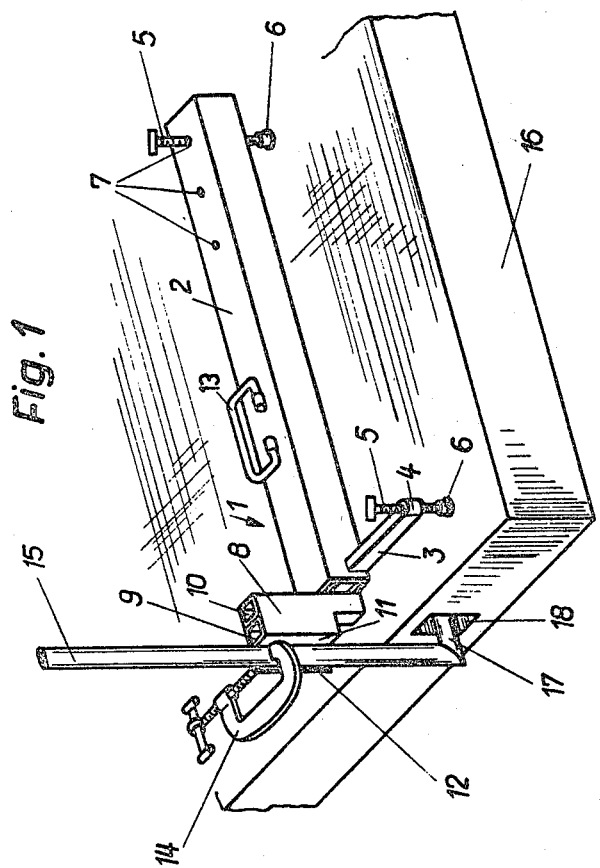
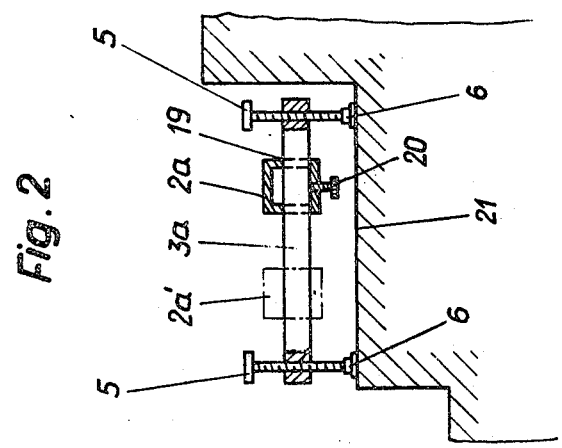

United States Patent Office 3,490,760
Patented Jan. 20, 1970

3,490,760
HOLDING DEVICE FOR THE BUILDING-IN OF UPRIGHTS
Walter Nill, Winterthur, Switzerland, assignor to Kuderli & Co., Zurich, Switzerland
Filed Sept. 7, 1966, Ser. No. 577,659
Claims priority, application Switzerland, Sept. 8, 1965, 12,497/65
Int. Cl. B23q *3/00;* E04g *23/00;* E04b *1/00*
U.S. Cl. 269—321          1 Claim

ABSTRACT OF THE DISCLOSURE

A device for temporarily holding an upright in a vertical position until the upright is fastened to a support, the device being constituted by a longitudinal beam and a transverse beam arranged in T-shape, the transverse beam being slidable on the longitudinal beam and adapted for being secured thereto in various positions therealong. An adjustable screw is mounted at the free end of the longitudinal beam and an adjustable screw is mounted at the opposite ends of the transverse beam, the screws being intended to rest on the support to which the upright is to be fastened. Fastened to the longitudinal beam at right angles thereto is a holder which has a channel with an outer surface from which a lug projects so as to form a dihedron in which the upright can be secured by a clamp.

---

The present invention relates to a holding device for uprights to be secured in a vertical position. Hitherto uprights to be fastened in vertical position had been temporarily held in such position, during the fastening by being attached to make-shift tripods or the like by means of wire, clamps or the like, whereby the accuracy of the position of the upright was often unsatisfactory and considerable time was wasted, particularly when holding the uprights of staircases or holding the railings of balconies while cementing the same in place.

The present invention has as its main object to overcome these disadvantages and to provide a holding device for uprights which establishes their accurate vertical position while being secured in place with inexpensively operable means.

With this and other objects in view which will become apparent later from this specification and the accompanying drawing, I provide a holding device for uprights, comprising in combination: a base, three adjustment screws screwed into said base and in operation resting on the floor of the structure to which the upright is to be secured, a holder piece fixed in an upright position to said base having two flat surfaces at right angles extending perpendicular to the base, and forming a dihedron, and clamps capable of clamping the upright to be built-in to said holder piece.

These and other features of my invention will be clearly understood from the following description of an embodiment and a modification thereof, given by way of example with reference to the accompanying drawing, in which:

FIG. 1 is a perspective view of a holding device according to the present invention, and FIG. 2 is a transverse section of a modification thereof.

Referring firstly to FIG. 1, the holding device comprises a T-shaped base 1 having a main beam 2 consisting of a hollow bar of rectangular profile and a transverse beam 3 consisting of a bar fixed to the underside of the beam 2, one half only of beam 3 being visible in FIG. 1. At both ends of the transverse beam 3 screw tapped bores 4 are provided, in each of which an adjustment screw 5 is engaged, which at its lower end is provided with a small cap 6 serving as a foot. In the vicinity of its free end, the main beam 2 is provided with several bores 7, in one of which a third adjustment screw 5 is engaged, which is screwed into a nut (not shown) fixed in the interior of the hollow beam 2, and is likewise provided with a foot cap 6.

At the end of the main beam 2 adjoining the transverse beam 3, a holder piece 8 is provided, which comprises two channels 9 and 10 of unequal length and both of rectangular profile. The holder piece 8 has an outer face 11 perpendicular to said base and a lug 12 projecting perpendicular to said outer face 11. The face 11 and lug 12 form a dihedron extending perpendicular to the two beams 2 and 3. A grip 13 mounted on the main beam 2 serves for comfortably transporting the holding device, for the use of which one or more clamps 14 of usual type are required.

As shown in FIG. 1, the holding device described may be used for fixing an upright 15 of a railing to the edge of the platform 16 of a balcony or the like. The upright 15 consists of a metal rail of a flattened hollow profile, and is provided at its lower end with a lateral projection 17, which engages in a recess 18 of the platform 16, which recess is to be filled with cement or the like. The upright 15 is attached by means of a clamp 14 to the lug 12 in such a manner that it also contacts the face 11, i.e. it stands perpendicular to the T-shaped base composed of the beams 2 and 3. By adjusting the three adjustment screws 5 the upright can be readily put into a vertical position, e.g. with the aid of a spirit level, and at the same time its level position can be adjusted. After cementing in the end 17 of the upright 15, the clamp 14 is detached, and the device is used for holding the next upright in a position in which it can be permanently secured. The channels 9 and 10 serve for attaching additional clamps 14 in another direction, i.e. so that the upright 15 is clamped against the outer face 11. How the upright is clamped to the holder piece 8 depends on the profile of the upright and the type of clamps available. In any case, the upright will be retained within the dihedron against the face 11, and lug 12. When the area on which the holding device is to be placed is rather small in the direction of the main beam 2, its adjustment screw 5 may be inserted in one of the other holes 7.

In the modification shown in FIG. 2, the transverse beam 3a is slidable in a corresponding opening 19 of the longitudinal beam 2a and can be arrested by means of a screw 20 in various positions on the same. This is useful for example for attaching the uprights of bannisters at the landing 21 of staircase, whose width is only slightly larger than the spacing of the two adjustment screws 5 arranged at the ends of the transverse beam 3a. The longitudinal beam 2a and the holder piece 8 attached to it (which is omitted in FIG. 2) can thus be brought into various positions, e.g. into the position shown in full lines or into the position 2a indicated in chain-dotted lines, in order to fit two correspondingly offset uprights.

The holding device described allows more accurate and speedier work than hitherto possible.

While I have described herein and illustrated in the accompanying drawings what may be considered typical and particularly useful embodiments of my said invention, I wish it to be understood that I do not limit myself to the particular details and dimensions described and

What I claim is:

1. A holding device for temporarily holding uprights to be secured in a vertical position, said holding device comprising a base, three adjustment screws screwed into said base and in operation resting on the structure into which the upright is to be secured, a holder piece fixed in an upright position to said base and forming a dihedron, and clamps capable of clamping the upright to said holder piece in said dihedron, said holder piece comprising at least one channel extending parallel to said dihedron for having a clamp mounted thereagainst, wherein said holder piece has a surface extending perpendicular to said base and a lug projecting perpendicularly from said surface so as to form therewith said dihedron, and wherein said base comprises a longitudinal beam and a transverse beam arranged in T-shape, said transverse beam being slidably mounted on said longitudinal beam and arrestable thereon in various positions, one of said adjustment screws being arranged near the free end of said longitudinal beam, and the other two adjustment screws being arranged near the ends of said transverse beam.

References Cited

UNITED STATES PATENTS

| 1,255,557 | 2/1918 | Norman | 248—44 |
| 2,592,895 | 4/1952 | Harris | 248—44 |
| 2,617,617 | 11/1952 | Krastel | 248—44 |
| 2,689,412 | 9/1954 | Young | 269—19 X |

ROBERT C. RIORDON, Primary Examiner

D. R. MELTON, Assistant Examiner

U.S. Cl. X.R.

52—127